Figures 1, 1A:
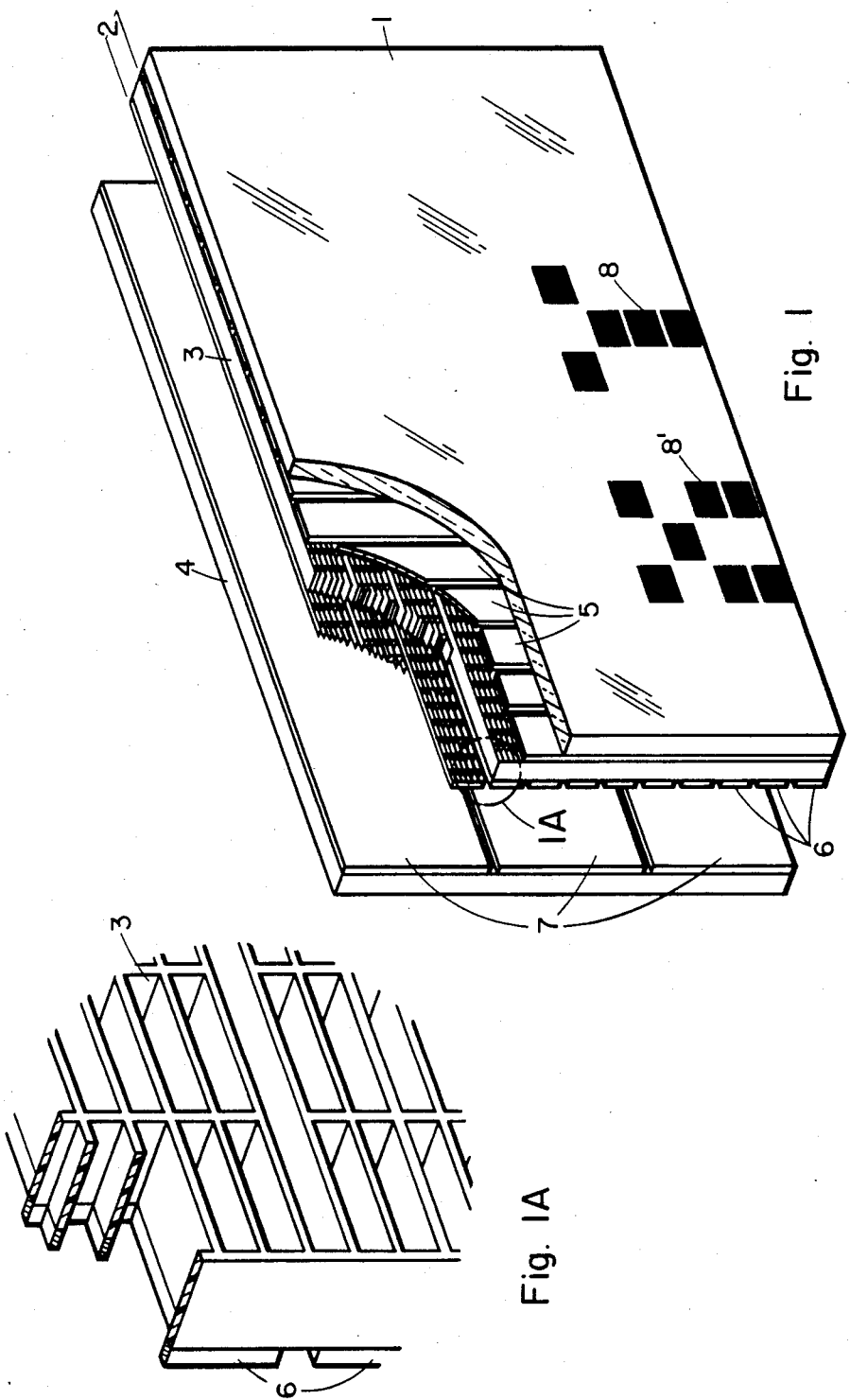

United States Patent [19]

Liebert et al.

[11] Patent Number: 4,522,472
[45] Date of Patent: Jun. 11, 1985

[54] ELECTROPHORETIC IMAGE DISPLAY WITH REDUCED DRIVES AND LEADS

[75] Inventors: Richard B. Liebert, Ridgefield, Conn.; Roger P. White, Yonkers, N.Y.

[73] Assignee: North American Philips Corporation, New York, N.Y.

[21] Appl. No.: 350,466

[22] Filed: Feb. 19, 1982

[51] Int. Cl.³ .............................................. G02F 1/01
[52] U.S. Cl. .................................. 350/362; 340/787; 340/716
[58] Field of Search ................. 350/362; 340/787, 716

[56] References Cited

U.S. PATENT DOCUMENTS

| 4,203,106 | 5/1980 | Dalisa et al. | 350/362 X |
| 4,303,917 | 12/1981 | Kishino et al. | 340/772 |
| 4,450,440 | 5/1984 | White | 340/787 |

OTHER PUBLICATIONS

Liebert et al., "A 512 Character Electrophoretic Display", 1980 Biennial Display Research Conf., Cherry Hill, NJ, Oct. 1980.

Primary Examiner—John K. Corbin
Assistant Examiner—Lynn Vandenburgh Kent
Attorney, Agent, or Firm—Paul R. Miller

[57] ABSTRACT

An electrophoretic display device is described where a set of anode electrodes in an electrophoretic cell are disposed opposite row and column electrodes at a second side of the electrophoretic cell. The anode electrodes encompass equal pluralities of at least the row electrodes, and such equal pluralities of electrodes are connected in parallel. This significantly reduces the number of leads to the display.

14 Claims, 3 Drawing Figures

ELECTROPHORETIC IMAGE DISPLAY WITH REDUCED DRIVES AND LEADS

The present invention is directed to an improved electrode structure and arrangement for controlling an electrophoretic display device wherein the number of leads required can be reduced.

Electrophoretic display devices are generally nonemissive field-effect display devices. They generally lack a suitable threshold in the brightness versus voltage characteristic, and accordingly, simple cross-bar matrix addressing methods are not applicable. Matrix addressing has been made practical by the incorporation of a third control grid electrode in the device structure, such as may be seen in U.S. Pat. No. 4,203,106 to Singer and Dalisa. In such structures it is possible to access $M \times N$ display elements with $M+N+1$ electrical leads and their associated drivers.

Non electrophoretic display devices may be seen in the patents to Nakamura et al, U.S. Pat. No. 3,826,949, and Criscimagna et al, U.S. Pat. No. 4,150,363, wherein interconnection leads may be reduced in number. Moreover, the electrode structures as provided in the Nakamura et al patent can involve row and column electrodes, together with an overlying third electrode structure to eliminate cross-talk between the electrodes and to act as selecting electrodes for changing over the indicator units.

The patent to Noma et al, U.S. Pat. No. 4,045,327, involves an electrophoretic matrix panel which utilizes dot-shaped intermediate electrodes isolated from each other on a voltage non-linear resistive layer between two sets of parallel electrodes extending transversely to one another. This structure again involves a matrix display panel which can display an image without crosstalk.

The prior art does not effectively reduce the number of electrode leads and drivers in an electrophoretic matrix display device. This is primarily required to more practically control and address electrophoretic matrix type displays, and to reduce the cost of drive electronics.

The present invention provides an electrophoretic matrix display device having distinctive characteristics over the prior art. The construction of the present invention enables a significant reduction in the number of leads and drivers in large matrix devices. The technique of the present invention can be implemented basically by changing the geometry of a standard control grid type of electrophoretic image display (EPID), such as described in U.S. Pat. No. 4,203,106.

An additional benefit according to the present invention is the possibility of selective erasure and rewriting in a matrix electrophoretic display construction.

In particular, the construction of the present invention may be seen in an electrophoretic display device comprising first and second oppositely disposed substrates with at least one of the substrates being transparent, a plurality of first electrodes disposed at a facing surface of a first substrate and a plurality of second electrodes disposed on a dielectric medium adjacent or covering the first electrodes. An electrophoretic liquid containing a plurality of charged pigment particles is disposed between the first and second substrates. To this structure in accordance with the present invention a plurality of third, or anode, electrodes is disposed on a facing surface of the other or second substrate, with each of the plurality of third electrodes being opposite to a number of the plurality of first and second electrodes. In this structure, means are provided for connecting equal numbers of the first electrodes in parallel and equal numbers of the second electrodes in parallel. Finally, means are provided for applying an enabling voltage bias value on at least one of the third electrodes while maintaining a lower voltage bias value on the remaining ones of the third electrodes. This structure in effect represents a three input AND gate analog since a response is obtained only when all three electrodes are addressed.

The structure of the present invention enables electrophoretic writing to be accomplished in only that portion of the structure opposite the enabled third, or anode, electrode. By this arrangement, the magnitude of the unenabled (third electrode) anode bias is made sufficiently small ("prevent" voltage) to prevent transport of pigment from the control grid structure (first and second electrodes) to the anode even though the voltages on the first and second electrodes would normally allow it. Consequently, regardless of the addressing voltages applied to the first and second electrodes opposite portions of the anode which are not enabled, writing will not occur. On the other hand, the anode bias is sufficiently high to prevent the return of pigment already on the anode to the control grid structure. This prevents unwanted erasure once writing has been accomplished. However, when an anode is enabled, writing will occur normally.

Figure 2:
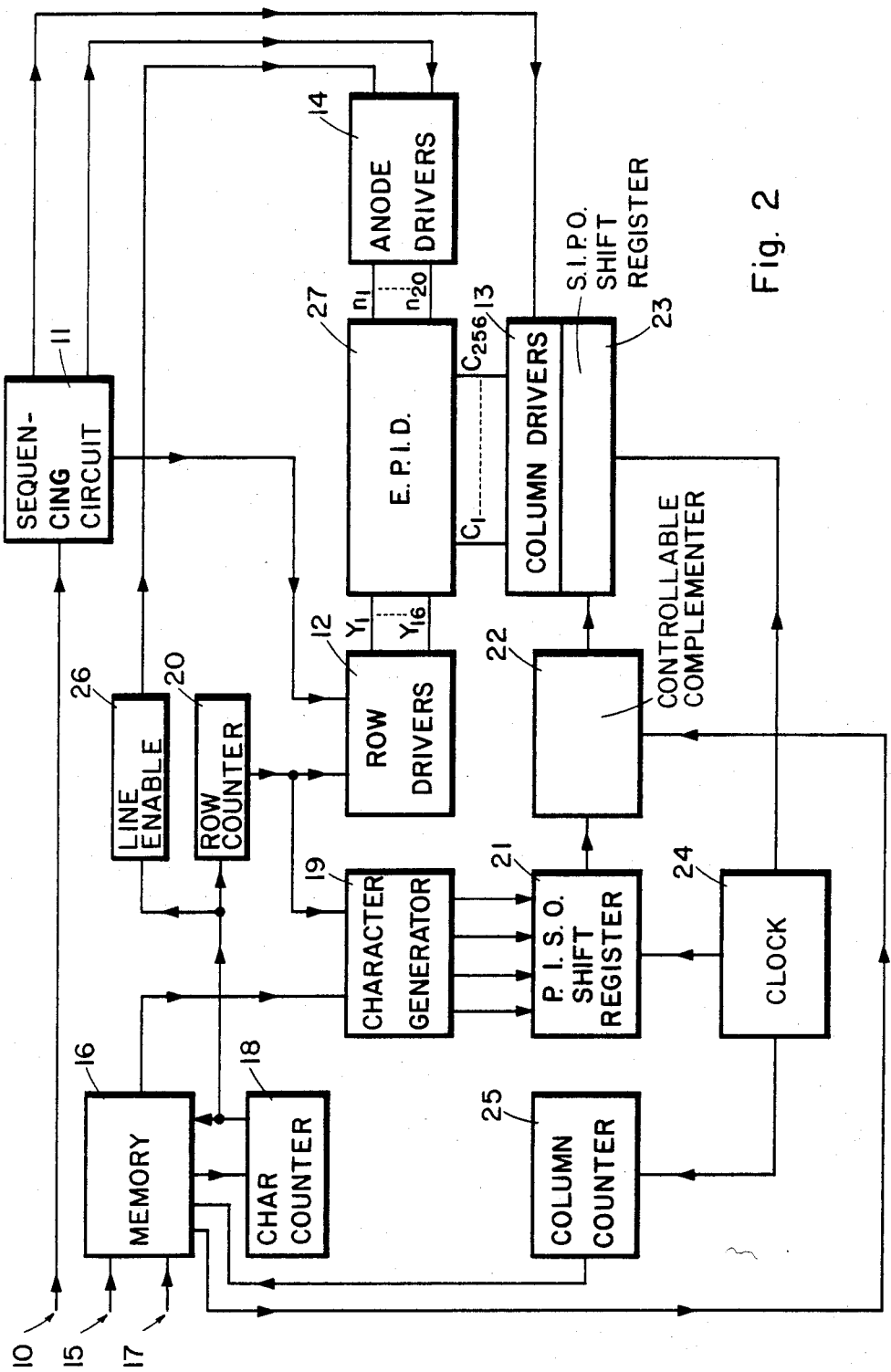

These various aspects of the present invention may be further understood by reference to the accompanying drawing figures which provide various examples without limitation, and wherein, FIG. 1 illustrates the structure of the present invention, FIG. 1a illustrates a portion of the structure of FIG. 1, and FIG. 2 illustrates the driving circuitry utilized in connection with the present invention.

The electrophoretic display device of the present invention may be seen, for example, by reference to FIG. 1. The electrophoretic display device involves two separated substrates 1 and 4, at least one of which is transparent by way of being a material such as glass or plastic. The control grid structure 2 involves a dielectric structure 3 having multiple holes throughout its surface in a regular configuration. A detail of the control grid structure 2 with row electrodes 6 can be seen in FIG. 1a. The row electrodes 6 are formed at one side of the dielectric layer 3, and at an opposite side of the dielectric layer 3, are column electrodes 5 transverse to the row electrodes 6.

Separated from the row electrodes 6 in the structure are the anode electrodes 7 which are shown, for example, in the drawing figure as extending transversely in parallel strips. The anode electrodes 7, of course, can involve a plurality of sections, each of which are adjacent to portions of both row electrodes 6 and column electrodes 5. An insulating structure (not shown) typically maintains the separated substrates and internal structure of electrodes and electrophoretic solution in a single structure.

In the structure illustrated in FIG. 1, the anode electrodes 7 consist of three individual electrode strips which are exactly opposite three groups of four row electrodes 6 in the control structure. If the first, fifth, and ninth row electrodes are connected in parallel, as are the second, sixth, and tenth row electrodes, the third, seventh, and eleventh row electrodes, and the fourth, eighth, and twelfth row electrodes, there will only be four external row leads. Consequently, the number of anode leads have increased from one to three, but the number of row leads has decreased from twelve to four with a net saving of six leads.

In operation, one of the anodes 7 would be enabled while the other two anodes would be held at the prevent level. The address pulse would appear on the row lead connected to the first, fifth and ninth row electrodes for a time $t_r$ and the column information would appear on all column electrodes simultaneously during the time $t_r$. Writing would occur in the first row electrode, and because the other two anode electrodes are not enabled, writing cannot occur in the fifth and ninth row electrodes. The address pulse would appear sequentially on the row lead connected to the second, sixth, and tenth row electrodes, and thereafter on the third, seventh and eleventh row electrodes, and subsequently the fourth, eighth and twelfth row electrodes for a time $t_r$ with new column information being presented for each row.

Consequently, after $4t_r$, writing would have occured in the first four row electrodes. Then another anode would be enabled while the remaining anodes would be at the present level. In this arrangement, four address pulses of duration $t_r$ each would be applied sequentially to the four external row leads. Therefore, after $8t_r$ a total of eight rows will have been written. The process is then repeated with the final anode electrode being enabled so that writing is completed in $12t_r$, which is the same time required for the standard device.

In operation, the anode voltage could be provided at enabling voltage levels (50 volts) or preventing voltage levels (10 volts). These levels would enable writing to occur so as to provide written images, such as 8 and 8' seen in FIG. 1, which represent enabling of the lower anode 7.

Certain criteria need be followed in order to obtain a matrix addressed control grid electrophoretic device with a practical minimum number of leads. In the instance where the reduction is the result of reducing both the number of row leads and the number of column leads, the following criteria may be observed. Namely, if X equals the number of external column leads, Y equals the number of external row leads, C equals the number of column electrodes, and R equals the number of row electrodes, then m can be taken to be equal to C/X which is equal to the number of vertical divisions of the anode. Further, n can be taken to be equal to R/Y which is equal to the number of horizontal divisions of the anode.

To make a practical drive circuit, X should be a multiple of the number of column electrodes in the character plus the space between characters, and Y should be a multiple of the number of row electrodes in the character plus the space between lines.

In a R×C matrix, the number of anode leads is (m) (n) and the total number of leads is (m) (n)+X+Y. It is this total that is minimized. A trial and error procedure is utilized to minimize the total number of leads.

This procedure is to write the factors of R which are multiples of Y in a list of ascending order of n, and make a similar list for the factors of C which are multiples of X in an ascending order of m. Values of m and n which are near the middle of a list are then chosen so that the total number of leads (m) (n)+X+Y are calculated. Finally, other nearby values for m and n are chosen until the combination which gives the lowest total is found.

In an example 24 lines of text with 60 characters per line in a 7 by 9 format with 2 rows between lines of characters and 2 columns between characters are provided. This results in a 540 by 264 matrix which would require 805 leads and drivers for the standard device. Table 1 gives (m) (n)+X+Y for all values of m and n. The minimum occurs for m equal 10 (X equals 54) and n equal 6 (Y equals 44) and is 158. This is a reduction in the number of leads, and drivers of greater than 80%.

TABLE 1

| | | (m) (n) + X + Y equal total leads. | | | | | | |
|---|---|---|---|---|---|---|---|---|
| n = | | 2 | 3 | 4 | 6 | 8 | 12 | 24 |
| Y = | | 132 | 88 | 66 | 44 | 33 | 22 | 11 |
| m = | X = | | | | | | | |
| 2 | 270 | 406 | 364 | 344 | 326 | 319 | 316 | 329 |
| 3 | 180 | 318 | 277 | 258 | 242 | 237 | 238 | 263 |
| 4 | 135 | 275 | 235 | 217 | 203 | 200 | 205 | 242 |
| 5 | 108 | 250 | 211 | 194 | 182 | 181 | 190 | 239 |
| 6 | 90 | 234 | 196 | 180 | 170 | 171 | 184 | 245 |
| 10 | 54 | 206 | 172 | 160 | 158 | 167 | 196 | 305 |
| 12 | 45 | 201 | 169 | 159 | 161 | 174 | 211 | 344 |
| 15 | 36 | 198 | 169 | 162 | 170 | 189 | 238 | 407 |
| 20 | 27 | 199 | 175 | 173 | 191 | 220 | 289 | 518 |
| 30 | 18 | 210 | 196 | 204 | 242 | 291 | 400 | 749 |
| 60 | 9 | 261 | 277 | 315 | 413 | 522 | 751 | 1460 |

The drive electronics for the present invention may be considered in FIG. 2. As an example, a display having 40 lines of 32 characters each is provided in FIG. 2. Prior to writing, the display must be conditioned by the erase signal 10 in conjunction with the sequencing circuit 11 and the row driver 12, column driver 13, and anode driver 14 feeding the electrophoretic display device 27. The sequence is erase, set and hold, which leaves the row electrodes at the hold voltage and the anode at the prevent voltage level.

Character information 15 is continuously fed into the memory 16 along with an additional signal 17 for tone change information when required.

When the required number of characters to fill the first line of text has been received and counted by the character counter 18, writing of the first line may commence. Of course, character information may be still fed into the memory 16. A first anode $n_1$ is placed at the enable voltage level. The code for the first character appears at the input to the character generator 19 and the row counter 20 tells the charcter generator 19 to present the column information for row $Y_1$ at its outputs. The parallel column information is fed into a parallel-input/serial-output shift register 21 to convert the parallel information into serial information. This serial information passes through a tone change circuit which is a controllable complementer 22 to the input of a serial-input/parallel-output shift register 23 whose parallel output feeds the column drivers 13. When the clock signal from clock 24 has shifted enough bits for one character width, a signal is sent to the memory 16 telling it to present the code for the second character to the input of the character generator 19. This process continues until all of the column information for row $Y_1$ has entered the column drivers 13 by way of the shift register 23.

At this point the driver for row $Y_1$ is enabled with a voltage $V_R$, and the entire line of row $Y_1$ is written. After the time $t_r$ required to write the row has passed, row $Y_1$ becomes non-selected. The process is now repeated for rows $Y_2$ through $Y_8$ until the entire line-of-text for line 1 is written. The process is then repeated for rows $Y_9$ through $Y_{16}$ until line 2 is written. After line 2 is written, anode $n_1$ is placed at the prevent voltage level, and anode $n_2$ is enabled, so that the third and fourth lines of text cen be written. This process continues until the entire display is written. Using this technique, each line of text is written as a simple matrix addressed cell, and while the process may appear long, everything except the actual transport of the pigment is done at electronic speeds. This drive scheme is similar to that required for the standard device, except that an additional voltage level (prevent) is provided to the anode.

The drive circuit for the case where the anode electrodes are divided vertically as well as horizontally, would be similar to the circuit described above with some modifications. In this case, writing can now begin before the entire line of characters has been entered. After enough characters have entered the memory 16 to fill one line of one anode segment width, writing may commence for that section. After that segement is written, writing moves to the next anode segment, etc. The change required in the drive circuit is that the character counter 18 must now enable consecutive anode segments of a line of text as the data enters, instead of waiting for the entire line to fill. Thus, with this system, writing begins sooner. Since the appropriate columns are connected in parallel, the SIPO shift register 23 and the number of column drivers 13 are greatly reduced.

While various embodiments of the present invention have been described, it is not intended to limit the present invention to the specifically described embodiments, and all modifications suggested from the description of the invention are intended to be included.

What we claim:

1. An electrophoretic display device comprising first and second oppositely disposed substrates with at least one of said substrates being transparent,
   a plurality of first electrodes disposed at a facing surface of said first substrate,
   a plurality of second electrodes disposed on a dielectric structure adjacent to said first electrodes,
   means for connecting equal numbers of at least said first electrodes in parallel,
   an electrophoretic fluid containing a plurality of charged pigment particles disposed between said first and second substrates,
   a plurality of third electrodes disposed on a facing surface of said second substrate, each of said plurality of third electrodes being opposite to a number of said plurality of first and second electrodes, and
   means for alternatively applying an enabling voltage bias value on one of said third electrodes and means for maintaining a lower voltage bias value on remaining ones of said third electrodes.

2. An electrophoretic display device according to claim 1, wherein an equal number of at least one of said first electrodes or said second electrodes are connected in parallel.

3. An electrophoretic display device according to claim 1, wherein a first equal number of said first electrodes are connected in parallel, and a second equal number of said second electrodes are connected in parallel.

4. An electrophoretic display device according to one of claims 1, 2 or 3, wherein said first electrodes are column electrodes and said second electrodes are row electrodes.

5. An electrophoretic display device according to claim 4, wherein said third electrodes are row electrodes.

6. An electrophoretic display device according to claim 5, wherein each of said third row electrodes encompass an area corresponding to a plurality of at least said second row electrodes.

7. An electrophoretic display device according to one of claims 1, 2 or 3, wherein said first electrodes are row electrodes and said second electrodes are column electrodes.

8. An electrophoretic display device according to claim 7, wherein said third electrodes are row electrodes.

9. An electrophoretic display device according to claim 8, wherein each of said third row electrodes incompass an area corresponding to a plurality of at least said first row electrodes.

10. An electrophoretic display device according to claim 1, wherein means for applying information voltages to said first electrodes and means for applying addressing voltages to said second electrodes are provided such that images appear at areas of said first substrate corresponding to areas of said one of said third electrodes having said enabling voltage bias value, said areas also corresponding to said first and second electrodes having said information and addressing voltages.

11. An electrophoretic display device according to claim 10, wherein said means for alternatively applying an enabling voltage bias value sequentially selects a new one of said third electrodes for writing new images after said images are formed.

12. An electrophoretic display device according to claim 11, wherein said means for applying information voltages to said first electrodes applies new information voltages to said first electrodes upon said selection of said new one of said third electrodes.

13. An electrophoretic display device according to claim 12, wherein said means for applying addressing voltages to said second electrodes selects another plurality of second electrodes opposite to said new one of said third electrodes in order to apply new addressing voltages to said another plurality of second electrodes upon selection of said new one of said third electrodes.

14. An electrophoretic display device according to claim 10, wherein said enabling voltage bias value is approximately 50 volts and said lower voltage bias value is approximately 10 volts.

* * * * *